United States Patent
Walker et al.

(10) Patent No.: US 12,065,151 B2
(45) Date of Patent: Aug. 20, 2024

(54) METHODS AND SYSTEMS FOR OPERATING A VEHICLE SUBJECT TO A TRAVEL RESTRICTION

(71) Applicant: Freeport-McMoRan Inc., Phoenix, AZ (US)

(72) Inventors: Mary Amelia Walker, Phoenix, AZ (US); Robert Catron, Phoenix, AZ (US); Nicholas Hickson, Phoenix, AZ (US)

(73) Assignee: Freeport-McMoRan, Inc., Phoenix, AZ (US)

( * ) Notice: Subject to any disclaimer, the term of this patent is extended or adjusted under 35 U.S.C. 154(b) by 207 days.

(21) Appl. No.: 17/891,275

(22) Filed: Aug. 19, 2022

(65) Prior Publication Data

US 2023/0054763 A1 Feb. 23, 2023

Related U.S. Application Data (60) Provisional application No. 63/235,950, filed on Aug. 23, 2021.

(51) Int. Cl.
*B60W 40/12* (2012.01)
*B60W 40/105* (2012.01)

(52) U.S. Cl.
CPC .......... *B60W 40/105* (2013.01); *B60W 40/12* (2013.01); *B60W 2556/10* (2020.02); *B60W 2556/45* (2020.02)

(58) Field of Classification Search
CPC ............... B60W 40/105; B60W 40/12; B60W 2556/10; B60W 2556/45
See application file for complete search history.

(56) References Cited

U.S. PATENT DOCUMENTS

| | | |
|---|---|---|
| 2014/0358382 A1 | 12/2014 | Kou et al. |
| 2016/0371979 A1 | 12/2016 | Casson et al. |
| 2017/0183005 A1 | 6/2017 | Elston et al. |
| 2019/0161101 A1 | 5/2019 | Brooks et al. |
| 2021/0039503 A1 | 2/2021 | Ishii |

OTHER PUBLICATIONS

International Search Report and Written Opinion, dated Dec. 19, 2022, for PCT/US2022/04937, 16 pages.

*Primary Examiner* — Mathew Franklin Gordon
(74) *Attorney, Agent, or Firm* — Fennemore Craig, P.C.

(57) ABSTRACT

Systems and methods of operating a vehicle subject to a travel restriction determine when the vehicle is traveling in an unloaded state; determine a speed of the vehicle when the vehicle is traveling in the unloaded state to produce an actual travel empty speed; compare the actual travel empty speed with an historical travel empty speed for the vehicle; and determine that the vehicle operation is subject to the travel restriction when the actual travel empty speed is less than a predetermined percentile of the historical travel empty speed. When the vehicle operation is not subject to the travel restriction, the systems and methods further evaluate vehicle operation based on an established performance parameter for the vehicle under a normal operating condition; and change a vehicle performance parameter during future vehicle operation based on the evaluation.

27 Claims, 4 Drawing Sheets

METHODS AND SYSTEMS FOR OPERATING A VEHICLE SUBJECT TO A TRAVEL RESTRICTION

CROSS-REFERENCE TO RELATED APPLICATION

This application claims the benefit of U.S. Provisional Patent Application No. 63/235,950, filed on Aug. 23, 2021, which is hereby incorporated herein by reference for all that it discloses.

TECHNICAL FIELD

The present invention relates to vehicle operations in general and more particularly to methods and systems for operating vehicles subject to travel restrictions.

BACKGROUND

Mining operations typically involve the delivery of large amounts of earthen materials, such as excavated ore, to various types of material processing systems to recover metals or other valuable minerals. In a mining operation, such further processing may also involve one or more comminution or size-reduction steps to reduce the size of the excavated ore from a relatively coarse size to a finer size suitable for subsequent processing. Thereafter, the size-reduced ore may be subjected to any of a wide range of processes to separate the commercially valuable minerals from the waste material or gangue.

In a typical open-pit mining operation, the ore to be mined is periodically fractured (e.g., by blasting). Large shovels are then used to load the fractured ore into haul trucks. The haul trucks then carry the excavated ore to various other locations throughout the mine for further comminution and/or processing. Such other locations may include one or more ore crushers, grinders, stockpiles, and waste dumps, just to name a few. Open-pit mining operations are conducted on a large scale and a given open-pit mine may involve the use of a large number of shovels, haul trucks, and processing systems in order to process the large volumes of material involved.

The overall efficiency of the mining operation is based in part on the efficiency of the equipment used to deliver the excavated ore to the various locations for further processing. Deviations of vehicle speeds and operating techniques from established normal ranges may create safety and equipment reliability issues, both of which can result in increased costs and reduced operating efficiency and productivity.

SUMMARY OF THE INVENTION

One embodiment of a method of operating a vehicle subject to a travel restriction may involve: Determining when the vehicle is traveling in an unloaded state; determining a speed of the vehicle when the vehicle is traveling in the unloaded state to produce an actual travel empty speed; comparing the actual travel empty speed with an historical travel empty speed for the vehicle; and determining that the vehicle operation is subject to the travel restriction when the actual travel empty speed of the vehicle is less than a predetermined percentile of the historical travel empty speed for the vehicle. When it has been determined that the vehicle operation is not subject to the travel restriction, the method may further involve: Evaluating the vehicle operation based on an established performance parameter for the vehicle under a normal operating condition; and changing a vehicle performance parameter during future vehicle operation based on the evaluation.

Also disclosed is a method of operating a vehicle carrying material from a loading area to a discharge area and returning to the loading area that may include: Defining a normal operating condition for the vehicle; establishing at least one performance parameter for the vehicle under the normal operating condition; measuring at least one performance parameter during vehicle operation; and determining when the vehicle operation is subject to a travel restriction. When it has been determined that the vehicle is not subject to the travel restriction, the method may further include: Comparing the measured performance parameter with the established performance parameter; determining a vehicle operational score based on the comparing step; and changing future vehicle operation based on the vehicle operational score.

A system for operating a vehicle subject to a travel restriction includes a speed sensor operatively associated with the vehicle. The speed sensor senses a vehicle speed and produces an output signal related thereto. A state sensor operatively associated with the vehicle produces an output signal related to a vehicle state. A control system operatively associated with the speed and state sensors: Determines when the vehicle is traveling in the unloaded state; determines the speed of the vehicle when the vehicle is traveling in the unloaded state to produce an actual travel empty speed; compares the actual travel empty speed with an historical travel empty speed for the vehicle; and determines that the vehicle operation is subject to the travel restriction when the actual travel empty speed is less than a predetermined percentile of the historical travel empty speed. A user interface operatively associated with the control system provides a user-discernable indication of whether the vehicle operation is subject to the travel restriction.

Also disclosed is a non-transitory computer-readable storage medium having computer-executable instructions embodied thereon that, when executed by at least one computer processor cause the computer processor to: Determine when the vehicle is traveling in an unloaded state; measure a speed of the vehicle when the vehicle is traveling in the unloaded state to produce an actual travel empty speed; compare the actual travel empty speed with an historical travel empty speed for the vehicle; determine that the vehicle operation is subject to the travel restriction when the actual travel empty speed is less than a predetermined percentile of the historical travel empty speed; and generate an output signal that is indicative of whether the vehicle operation is subject to the travel restriction.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
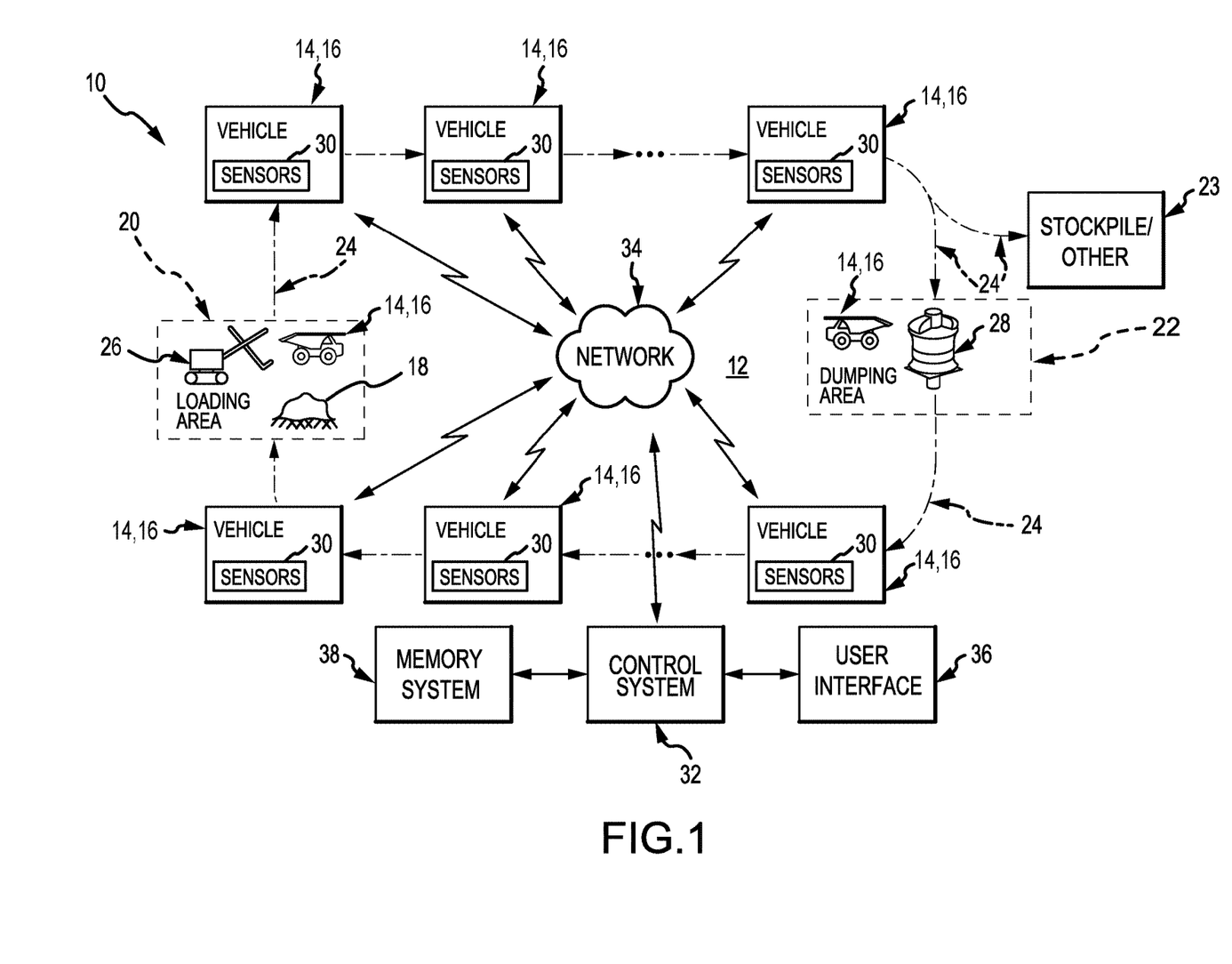
FIG. 1 is a schematic representation of one embodiment of a system for operating a vehicle subject to a travel restriction.

One embodiment of a system 10 for operating a vehicle subject to a travel restriction is illustrated in FIG. 1 as it could be used in an open-pit mining operation 12. Open-pit mining operation 12 may include a plurality of vehicles 14, such as haul trucks 16, that are configured to carry excavated material 18 from one or more loading areas 20 to one or more dumping areas 22 via a mine road network 24. Each loading area 20 may include one or more shovels or loaders 26 for loading excavated material 18 into the haul trucks 16. Some dumping areas 22 may include one or more grinders or crushers 28 for crushing or comminuting excavated material 18 from the haul trucks 16, whereas other dumping areas 22 may simply include areas for receiving the excavated material 18, such as, for example, one or more stockpiles, waste piles, or other extraction processes 23.

In a typical operation, excavated material 18 is loaded into vehicles 14, e.g., haul trucks 16, at one of the loading areas 20 by shovel or loader 26. Once loaded, the haul trucks 16 carry the excavated material 18 to one of the dumping areas 22. At the dumping area 22, the haul trucks 16 dump or discharge the excavated material 18 for further processing. The now empty haul trucks 16 then return to one of the loading areas 20 to receive additional amounts of excavated material 18 in a process referred to herein as a 'cycle.'

Figure 3:
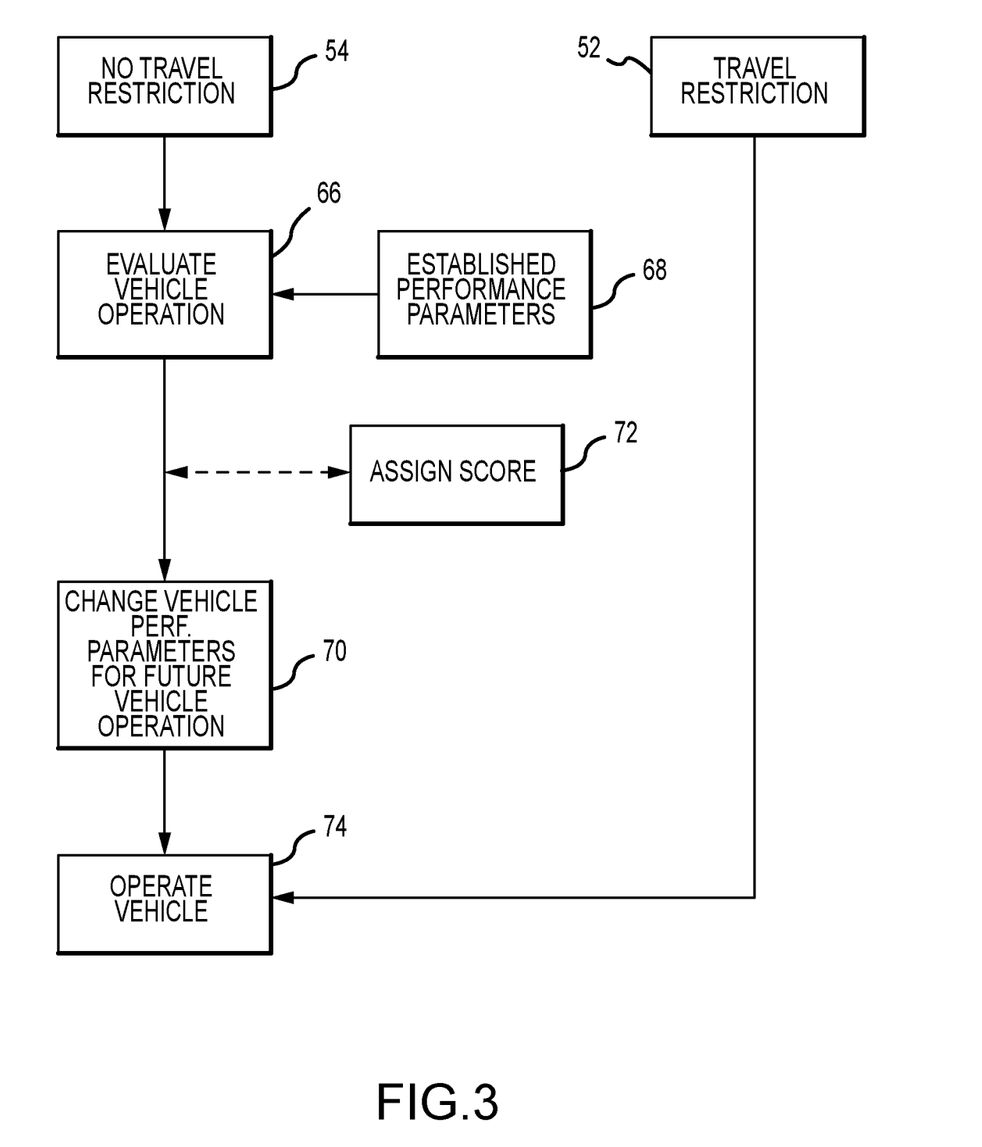
FIG. 3 is a flow chart representation of one embodiment of an evaluation and future vehicle operation process that may be performed when vehicle operation is not subject to a travel restriction.

With reference now to FIG. 3, a vehicle 14, e.g., haul truck 16 and/or haul truck operator (not shown), may be evaluated at step 66 to determine how closely the actual operation of the vehicle 14 (e.g., during the cycle) followed one or more performance parameters established for vehicles under normal operating conditions. Such established performance parameters 68 may include, but are not limited to, vehicle speed, transmission use (e.g., gear selection), throttle use, retarder use, and brake use. If the evaluation process 66 reveals that vehicle 14 (or vehicle operator) did not operate in accordance with the established performance parameters 68, then at least one vehicle performance parameter may be changed at step 70 for future vehicle operation. The vehicle 14 may then be operated at step 74. Some embodiments may use an optional scoring process 72 to assign a score to a vehicle or vehicle operator based on the evaluation step 66. For example, vehicles 14 that are operated outside the established performance parameters 68 (e.g., either higher or lower than a desired range) may be assigned a lower score than vehicles 14 that are operated within the established performance parameters 68. Similarly, greater deviations from the established performance parameters 68 may result in a lower score than would lesser deviations.

However, accurate evaluation and/or scoring of vehicle performance (i.e., whether the vehicle 14 is being operated in accordance with the established performance parameters 68) may be difficult if external factors or 'travel restrictions' are present that restrict or otherwise hamper the ability of the vehicles 14 to perform optimally (i.e., in accordance with the established performance parameters 68) during the cycle. In mining environment 12, such external factors or travel restrictions may include, but are not limited to, inclement weather (e.g., rain, fog, snow, freezing rain, or ice), slippery roads, bad road conditions, i.e., roads in need of repair, equipment breakdowns, traffic congestion, and ore spillage, just to name a few. If present, such travel restrictions may adversely affect the ability to operate the vehicles 14 in accordance with the established performance parameters 68.

Referring back now to FIG. 1, each vehicle 14, e.g., haul truck 16, may be provided with a plurality of sensors 30 that are operatively associated with various systems and devices of the haul truck 16. The sensors 30 produce output signals and/or data that are related to the various associated systems and devices. As will be described in much greater detail below, the output signals and/or data from the sensors 30 may be used by the methods, systems, and instrumentalities disclosed herein to determine whether the vehicles 14, e.g., haul trucks 16, are subject to a travel restriction.

The various sensors 30 may comprise a state sensor (not separately shown) for sensing the payload state (e.g., loaded or empty) of the haul truck 16. In some embodiments, the state sensor may comprise a payload sensor (also not separately shown) mounted to the haul truck 16 and operatively associated with the dump bed of the haul truck 16. In other embodiments, the state sensor could comprise a position sensor (not separately shown) operatively associated with the haul truck 16. If so, the 'state' of the vehicle measured by the position sensor will be the position of the haul truck 16. The payload state of the haul truck 16 (e.g., loaded or empty) could then be determined based on the position or location of the haul truck 16 in a manner that will be described in further detail herein. Sensors 30 may also include a speed sensor (also not separately shown) for sensing the speed of the haul truck 16. The output signals and/or data from the speed sensor will be related to the speed of the haul truck 16.

The various sensors 30 provided on each vehicle 14 may be operatively connected to a control system 32 via one or more networks 34. Control system 32 may be operatively connected to a user interface system 36 and a memory system 38. User interface system 36 may include one or more input devices (not shown) to allow a user to provide information, data, and commands to control system 32 in accordance with the teachings provided herein. User interface system 36 may also include one or more display devices (also not shown) to allow control system 32 to display information and data in user-discernable form. Memory system 38 may be used to store information and data associated with the operation of system 10 such as, for example, historical travel empty speeds.

Figure 2:
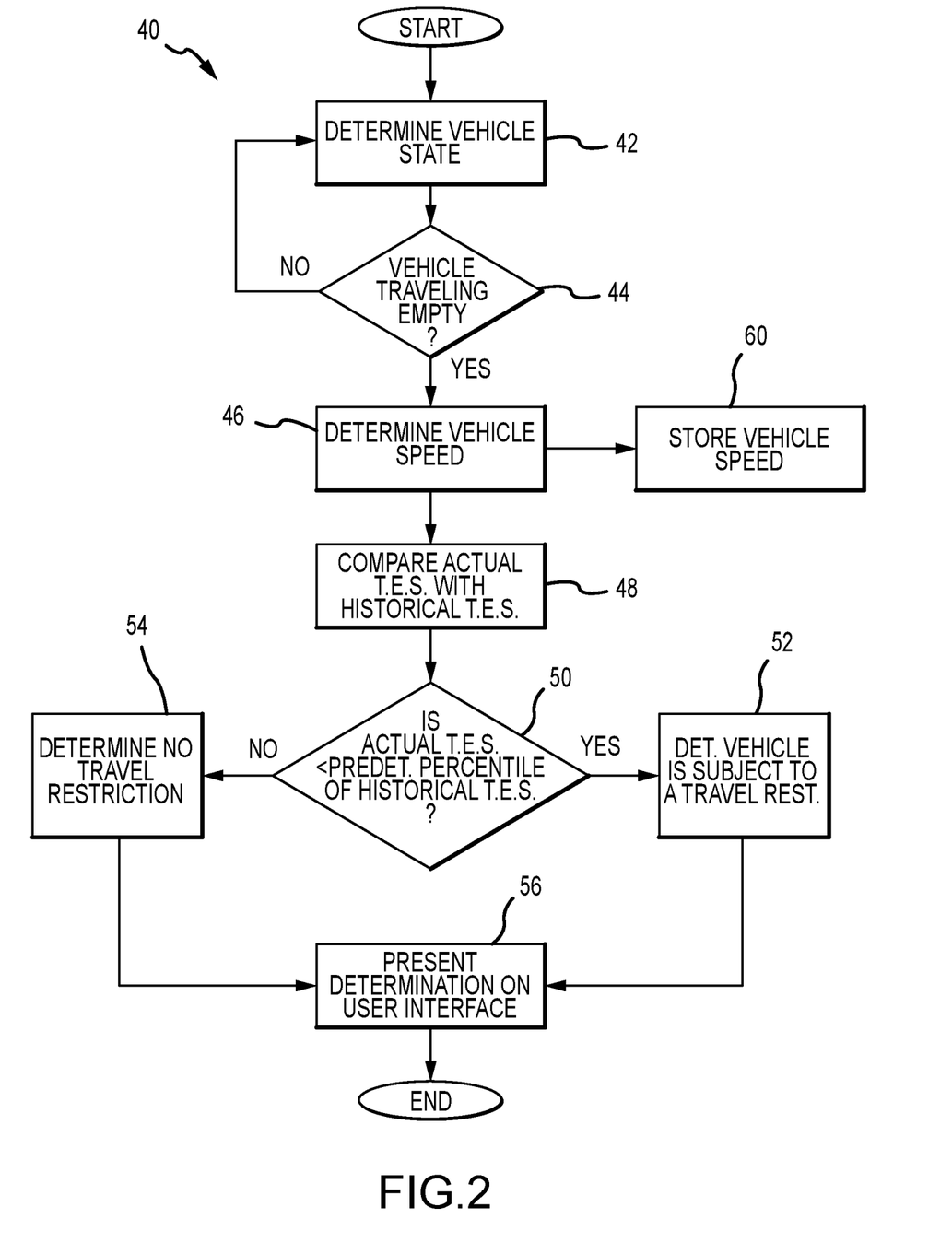
FIG. 2 is a flow chart representation of one embodiment of a method of operating a vehicle subject to a travel restriction.

Referring now to FIGS. 1 and 2 together, in one embodiment control system 32 may be configured to operate in accordance with a method 40 to determine when vehicle 14, e.g., haul truck 16, is subject to a travel restriction. A first step 42 in method 40 involves determining a payload state of vehicle 14, i.e., whether vehicle 14 is traveling in a loaded state or in an unloaded or empty state. If control system 32 determines at step 44 that the vehicle 14 (e.g., haul truck 16) is not traveling empty, then the method 40 may return to step 42. Alternatively, if the vehicle 14 is determined to be traveling in the unloaded or empty state, control system 32 then determines, at step 46, the speed of the unloaded vehicle 14. In one embodiment, control system 32 determines the speed of the vehicle 14 from the output signals and/or data produced by a vehicle speed sensor 30. The speed of the vehicle 14 when traveling in the empty state may be referred to herein in the alternative as the 'actual travel empty speed.'

Proceeding now to step 48, control system 32 may compare the actual travel empty speed of the vehicle 14 with an historical travel empty speed. The historical travel empty speed may be retrieved from a memory system 38 (FIG. 1)

operatively associated with control system 32. If control system 32 determines, in step 50, that the actual travel empty speed is less than a predetermined percentile of the historical travel empty speed, then control system 32 determines, in step 52, that the vehicle 14 is subject to a travel restriction. Alternatively, if the actual travel empty speed is not less than the predetermined percentile of the historical travel empty speed, then the control system 32 determines, in step 54, that the vehicle 14 not subject to a travel restriction. In step 56, control system 32 may then present, e.g., on user interface system 36, the determination of whether the vehicle 14 is, or is not, subject to a travel restriction. See also FIG. 4.

With reference back now to FIG. 3, if the vehicle 14 was not subject to a travel restriction, e.g., as may have been determined in step 54, then the operation of vehicle 14 or vehicle operator (not shown) may be evaluated, at step 66, based on at least one of the established performance parameters 68 for the vehicle during normal operation. Optionally, a score may be assigned to vehicle 14 (or vehicle operator) at step 72 based on the evaluation 66. One or more of the vehicle performance parameters may then be changed or varied 70 for future vehicle operation based on the evaluation or score (if a score was assigned to vehicle 14). Vehicle 16 may then be operated at step 74. On the other hand, if it is determined that the vehicle is subject to a travel restriction, i.e., at step 52, then the evaluation procedure may be postponed or held in abeyance until the travel restriction is no longer present. The vehicle may continue to be operated at step 74.

A significant advantage of the systems, methods, and instrumentalities disclosed herein is that they may be used to more reliably determine when a vehicle 14 is subject to a travel restriction. The increased reliability will ensure that the evaluation of the vehicle operation is much more reflective of the true performance (i.e., whether optimal or deficient) of vehicle 14 compared to instances when the vehicle 14 is operating under an undetected travel restriction. As a consequence, any changes to vehicle performance parameters that are made for future operation of vehicle 14 will be much more likely to return the vehicle operation to optimal performance (i.e., within the established vehicle performance parameters). Besides possibly reducing the cycle time and increasing the productivity of the vehicle 14 during each cycle, the ability to return the vehicle operation to an optimal performance level will also reduce the need for unscheduled vehicle maintenance and repair as well as associated downtime. The methods and systems of present invention therefore represent an improvement in the technology of material transport and haulage systems and the operation thereof.

Still other advantages are associated with the systems, methods, and instrumentalities disclosed herein. For example, we have discovered that measuring the travel speeds of vehicles 14 (e.g., haul trucks 16) when they are in the unloaded state, i.e., traveling empty, provides for a much more accurate and reliable determination of whether they are operating subject to a travel restriction than would otherwise be the case, e.g., if the speeds of loaded haul trucks 16 were used instead. In most mining operations, loaded haul trucks 16 are generally traveling uphill (e.g., from a loading area 20 to a dumping area 22) and at very slow speeds. Therefore, loaded haul trucks 16 are not affected by, or greatly affected by, commonly encountered travel restrictions, such as slippery haul roads, haul roads in need of repair, excessive traffic, etc. However, the same is not the case for unloaded haul trucks 16. Unloaded haul trucks 16 typically travel at much higher speeds than do loaded haul trucks 16. In addition, they are usually traveling downhill (e.g., returning to a loading area 20). Therefore, unloaded haul trucks 16 tend to be much more sensitive to travel restrictions than are loaded haul trucks 16.

Having briefly described certain exemplary embodiments of the systems, methods, and instrumentalities associated with the present invention, as well as some of their more significant features and advantages, various embodiments and variations of the systems, methods and instrumentalities associated with the present invention will now be described in detail. However, before proceeding the description, it should be noted that while the various embodiments are shown and described herein as they could be used in an open-pit mining operation to ensure the optimal operation of vehicles subject to travel restrictions, the present invention is not limited to use in conjunction with mining applications. To the contrary, the present invention could be used in any of a wide range of applications, such as quarrying and logging operations, that involve the batch delivery of materials to defined receiving locations, as would become apparent to persons having ordinary skill in the art after having become familiar with the teachings provided herein. Consequently, the present invention should not be regarded as limited to use in any particular type of application, environment, or equipment.

Referring back now primarily to FIG. 1, one embodiment of a system 10 for operating a vehicle subject to a travel restriction is shown and described herein as it could be used in conjunction with an open-pit mining operation 12. As mentioned, the mining operation 12 may comprise a plurality of vehicles 14, such as haul trucks 16, that are configured to carry excavated material 18 from one or more loading areas 20 to one or more dumping areas 22 via a mine road network 24.

In a typical operational scenario, excavated material 18 is loaded into haul trucks 16 at one of the loading areas 20 by a shovel or loader 26. Once loaded, the haul trucks 16 carry the excavated material 18 to one of the dumping areas 22. At the dumping area 22, the haul trucks 16 dump or discharge the excavated material 18 for further processing. The now empty haul trucks 16 then return to one of the loading areas 20 to receive additional amounts of excavated material 18. This process may also be referred to herein as a cycle.

Each vehicle 14, e.g., haul truck 16, may be provided with a plurality of sensors 30 that are operatively associated with various systems and devices of the haul truck 16. As briefly mentioned earlier, the sensors 30 produce output signals and/or data that are related to the various associated systems and devices.

More specifically, and in the particular exemplary embodiments shown and described herein, the various sensors 30 may comprise a state sensor (not separately shown) for sensing, directly or indirectly, the payload state (e.g., loaded or empty) of the haul truck 16. In some embodiments, the state sensor may comprise a payload sensor (also not separately shown) mounted to the haul truck 16 and operatively associated with the dump bed of the haul truck 16. The output signals and/or data from the payload sensor may be related to the payload of the haul truck 16. The payload state of the haul truck 16 (e.g., loaded or empty) may then be directly determined from the signals and/or data produced by the payload sensor. In other embodiments, the state sensor may comprise a position sensor (not separately shown) operatively associated with the haul truck 16. Output signals and/or data from the position sensor may be related to the position of the haul truck 16. The payload state of the haul truck 16 may then be indirectly determined from the signals and/or data produced by the position sensor in accordance with the descriptions provided herein. Sensors 30 may also include a speed sensor (also not separately shown) for sensing the speed of the haul truck 16. The output signals and/or data from the speed sensor may be related to the speed of the haul truck 16.

In many embodiments, the various sensors 30 may comprise all or a portion of a vehicle information management system (VIMS) and associated vehicle data network or networks (not separately shown) that may be provided on each haul truck 16. Together, such systems provide data sensing and reporting functionalities to facilitate the monitoring of the various haul truck components, states, and systems, as described herein. By way of example, such vehicle data networks may include, but are not limited to, Local Interconnect Networks ("LIN," e.g., configured in accordance with ISO 1941 and ISO 17987); Controller Area Networks ("CAN," e.g., configured in accordance with ISO 11898); and "FlexRay" (e.g., configured in accordance with ISO 17458). A haul truck 16 may be provided with more than one vehicle network.

It should be noted that sensors 30 suitable for monitoring the various components, systems, and states of each haul truck 16 are well-known in the art and are commonly provided as OEM equipment on a wide range of haul trucks 16. Therefore, the particular sensors 30 that may be utilized in conjunction with the present invention will not be described in further detail herein.

As briefly mentioned earlier, in some embodiments the sensors 30 may comprise position or location sensors for sensing the position or location of the haul truck 16 as it operates within the mining operation 12. Such position sensors (e.g., as part of sensors 30) may comprise satellite-based position sensors that obtain position data from a constellation of satellites, such as those associated with the Global Positioning System (GPS), although other satellite-based position sensors are known and could be used instead. Alternatively, the position data may be obtained from other types of position sensors, such as from inertial sensing systems or from ground-based radio navigation systems. Consequently, the present invention should not be regarded as limited to any particular type of position sensors.

In embodiments using one or more position sensors to sense the positions of the vehicles 14, it may be desirable or advantageous to first process the data provided by the position sensors so that they may be more easily processed or handled by control system 32. The position data provided by the position sensors may be processed in accordance with the teachings described in U.S. Pat. No. 10,712,448, entitled "Real-Time Correlation of Sensed Position Data with Terrestrial Features," which is specifically incorporated herein by reference for all that it discloses. Alternatively, the position data may be processed in accordance with the teachings described in U.S. Pat. No. 10,002,109, entitled "Systems and Methods of Correlating Satellite Position Data with Terrestrial Features," which is also specifically incorporated herein by reference for all that it discloses.

Briefly, the systems and methods described in U.S. Pat. Nos. 10,712,448 and 10,002,109 correlate sensed position data with surveyed data associated with a mine road network. The patents also describe systems and methods for "snapping" or correlating the position data to unique terrestrial features. In the context of the present invention, such a correlation allows the locations of the various haul trucks 16 to be readily correlated or "snapped" to known positions on the road network 24. The systems and methods described in the patents may be used to provide highly accurate and timely position data, typically within about 9 m (about 30 ft.) of the actual position of the haul truck 16. The position data are also updated at high frequency, typically once every second, thereby significantly improving the ability determine the locations of haul trucks 16 traversing road network 24.

The various sensors 30 of each vehicle 14 may be operatively connected to control system 32 via network system 34. Network system 34 may comprise one or more wireless networks, wired networks, or combinations thereof, in order to facilitate the transfer of information and data from the various sensors 30 to control system 32. By way of example, in one embodiment, network system 34 may comprise a wireless network component (not separately shown) provided at the mining operation 12. Such a wireless network may comprise a first link or component of network system 34 and may be used to capture and relay signals and/or data from the sensing systems 30 to a local area network infrastructure (also not separately shown) provided at the mining operation 12. Thereafter, another wide area network system (not shown) may be used transfer and/or relay the signals and/or data to a centralized network infrastructure (also not shown) which may be operatively associated with control system 32. Of course, other variations and configurations of network system 34 are possible, as would become apparent to persons having ordinary skill in the art after having become familiar with the teachings provided herein. Therefore, the network system 34 shown and described herein should not be regarded as limited to any particular components, types, architectures, or configurations.

Control system 32 may comprise one or more general purpose programmable computers of the type that are well-known in the art or that may be available in the future, as would become apparent to persons having ordinary skill in the art after having become familiar with the teachings provided herein. Consequently, the particular control system 32 that may be used in conjunction with the various embodiments will not be described in further detail herein.

Control system 32 may be programmed to operate in accordance with the methods described herein. The methods may be embodied in various software packages or modules provided on non-transitory computer-readable storage media accessible by control system 32. The various software packages or modules may be provided with computer-executable instructions that, when performed by control system 32, cause control system 32 to process information and data in accordance with the teachings provided herein.

User interface system 36 may comprise one or more data input systems, such as keyboards, pointers, or touch screen displays (not shown) that are now known in the art or that may be developed in the future that would allow one or more users to interface with (i.e., provide data and commands to) system 10. User interface system 36 may also comprise one or more display systems (also not shown) to allow control system 32 to provide information and data in user-discernible form. However, because user interface systems and associated data input and display systems are well-known in the art and could be readily provided by persons having ordinary skill in the art after having become familiar with the teachings provided herein, the particular user interface system 36 that may be used in the various embodiments will not be described in further detail herein.

Memory system 38 may comprise any of a wide range of memory systems that are now known in the art or that may be developed in the future that are or would be suitable for storing information, data, and commands required by control system 32 or other components of system 10. However, because such memory systems are well-known in the art and could be readily provided by persons having ordinary skill in the art after having become familiar with the teachings provided herein, the particular memory system 38 that may be used in conjunction with the present invention will not be described in further detail herein.

Referring now primarily to FIG. 2, the various components of system 10, including control system 32, may be configured or programmed to operate in accordance with a method 40 to determine when vehicle 14, such as haul truck 16, is subject to a travel restriction. A first step 42 involves determining the payload state of vehicle 14, i.e., whether vehicle 14 is traveling in a loaded state or in an unloaded or empty state. The payload state of the vehicle 14 may be determined from the output signal produced by the state sensing system (e.g., as a component of sensors 30). For example, if the state sensing system 30 comprises a payload sensor, then the load state of the vehicle 14 may be determined from the output signal produced by the payload sensor. In embodiments wherein the sensors 30 include a vehicle position sensor (again, not separately shown), the load state of the vehicle 14 may be determined from position data provided by the vehicle position sensing system. For example, if the output signals (i.e., position data) produced by the vehicle position sensing system reveal that the vehicle 14 is traveling from a dumping area 22 to a loading area 20, control system 32 may conclude that the vehicle 14 is traveling in the unloaded or empty state. Alternatively, if the output signals from the position sensor reveals that the vehicle 14 is traveling from a loading area 20 to a dumping area 22, then control system 32 may conclude that the vehicle 14 is traveling in the loaded state.

In any event, and regardless of how the payload state of the vehicle is determined, if control system 32 determines at step 44 that vehicle 14 (e.g., haul truck 16) is not traveling empty, then the method 40 may return to step 42. Alternatively, if the vehicle 14 is determined to be traveling in the unloaded or empty state, control system 32 may then determine, at step 46, the speed of the unloaded vehicle 14. In one embodiment, control system 32 determines the speed of the vehicle 14 from the output signals and/or data produced by the vehicle speed sensor. Again, vehicle speed sensor may comprise a portion of sensors 30. In other embodiments, the vehicle speed may be indirectly determined from position sensor (e.g., from the first time derivative of position changes). In any event, the speed of the vehicle 14 when traveling in the empty state may be referred to herein in the alternative as the 'actual travel empty speed.'

Figure 4:
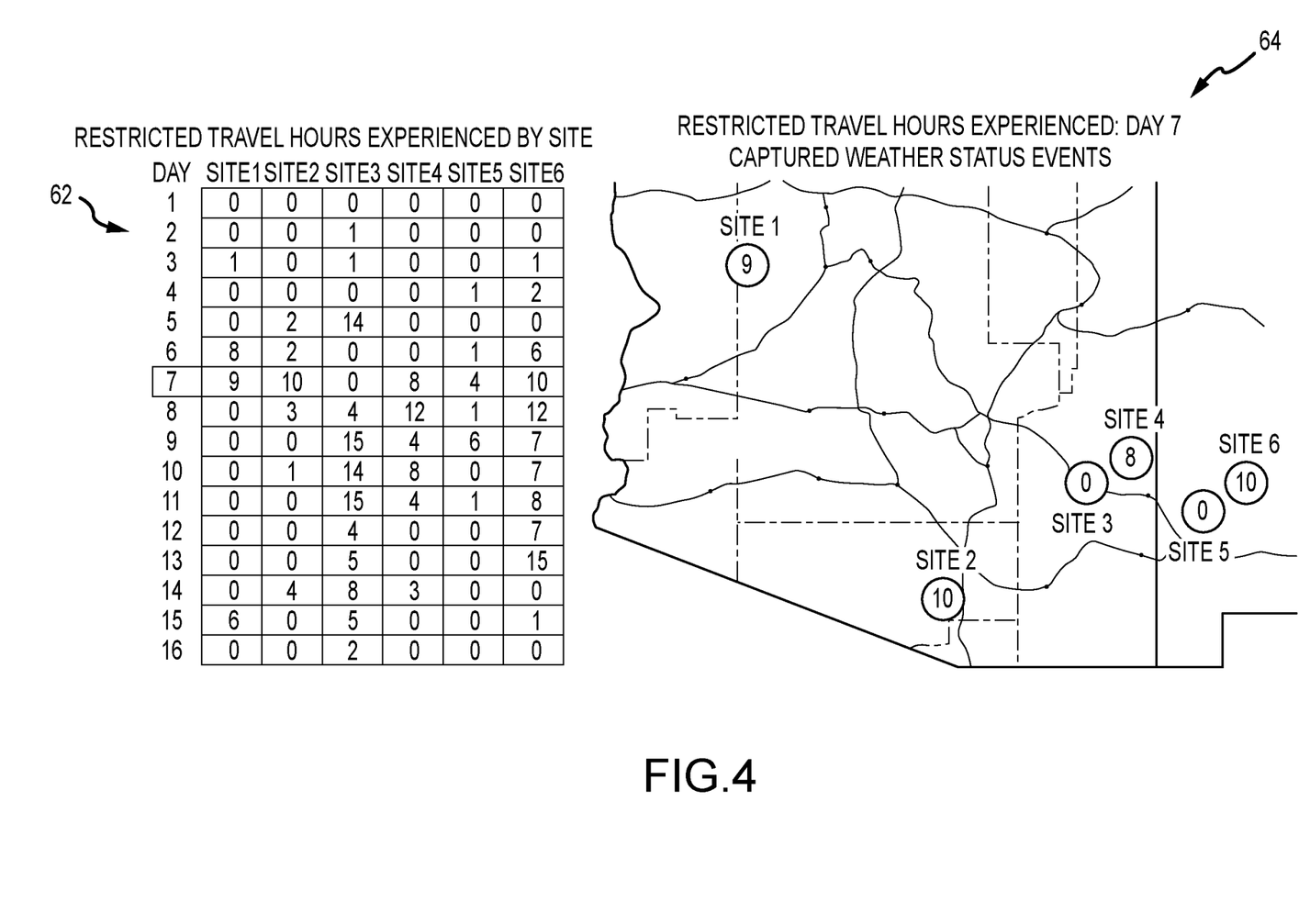
FIG. 4 is an example of a display that may be provided on a user-interface system showing the number of hours of travel restrictions on various days at various mine sites.

Proceeding now to step 48, control system 32 compares the actual travel empty speed of the vehicle 14 with an historical travel empty speed. The historical travel empty speed may be retrieved from memory system 38 (FIG. 1). If control system 32 determines, in step 50, that the actual travel empty speed is less than a predetermined percentile of the historical travel empty speed, then control system 32 determines, in step 52, that the vehicle 14 is subject to a travel restriction. Alternatively, if the actual travel empty speed is not less than the predetermined percentile of the historical travel empty speed, then the control system 32 determines, in step 54, that the vehicle 14 not subject to a travel restriction. In step 56 control system 32 may then present, e.g., on user interface system 36, the determination of whether the vehicle 14 is, or is not, subject to a travel restriction. An example of a display that may be provided on user interface system 36 is depicted in FIG. 4.

As mentioned above, step 48 compares the actual travel empty speed with the historical travel empty speed. In the embodiments shown and described herein, the historical travel empty speed comprises a previously determined actual travel empty speed. Therefore, method 40 may include step 60 in which the control system 32 stores in memory system 38 the actual travel empty speed. The travel empty speeds stored in memory system 38 then become historical travel empty speeds.

Referring now primarily to FIG. 3, if method 40 (FIG. 2) determined that the vehicle 14 was not subject to a travel restriction (e.g., at step 54), then the vehicle operation may be evaluated at step 66 to determine whether the vehicle 14 was operated in accordance with one or more established performance parameters 68 for the vehicle 14. As mentioned earlier, in a typical open-pit mining operation 12, established performance parameters 68 may include, but are not limited to, vehicle speed, transmission use (e.g., gear selection), throttle use, retarder use, and brake use.

If the evaluation process 66 reveals that vehicle 14 (or vehicle operator) did not operate in accordance with one or more of the established performance parameters 68, then at least one vehicle performance parameter may be changed at step 70 for future vehicle operations. In some embodiments, change may be implemented by providing appropriate instructions to the vehicle operator. The vehicle 14 may then be operated at step 74.

Some embodiments may use a scoring process 72 to assign a score to a vehicle or vehicle operator based on the evaluation step 66. For example, vehicles 14 that are operated outside the established performance parameters 68 (e.g., either higher or lower than a desired range) may be assigned a lower score than vehicles 14 that are operated within the established performance parameters 68. Similarly, greater deviations from the established performance parameters 68 may result in a lower score than would lesser deviations.

In this regard, it should be noted that evaluation step 66 and scoring step 72 (if provided) may be performed by a system operator or fleet manager (not shown) based on the determination provided by system 10 and displayed on user interface system 36 (FIG. 4). Alternatively, steps 66 and 72 could be performed automatically by control system 32, i.e., without any discretionary decision-making by the system operator or fleet manager. Of course, if system 10 determined that the vehicle 14 was operating subject to a travel restriction (e.g., at step 52), then the system operator or fleet manager may elect to defer or hold in abeyance any evaluation process 66 or scoring process 72.

EXAMPLES

The systems, methods, and instrumentalities of the present invention may be more easily understood by considering examples of how they may be applied to an open-pit mining operation 12 having a plurality or fleet of vehicles 14, such as haul trucks 16, that travel on a mine road network 24 between various loading areas 20 and unloading areas 22.

The systems, methods, and instrumentalities of the present invention may start by developing, producing, or by simply accessing a database of historical travel empty speeds for the various haul trucks 16 in the haul truck fleet. As briefly described above, the historical travel empty speeds may comprise a plurality of actual travel empty speeds that have been previously stored (e.g., in step 60) by control system 32, for example, in memory system 38. That is, a database of historical travel speeds may comprise previously stored actual travel empty speeds. The database of historical travel speeds therefore may grow in size as new actual travel empty speeds determined and stored by control system 32. If desired, older historical travel speeds may be removed or purged from the database (e.g., stored in memory system 38) on a first-in, first-out basis. In the particular embodiments shown and described herein, the database of historical travel speeds may comprise travel speeds obtained over the previous calendar year.

Control system 32 may acquire the actual travel empty speed from each empty haul truck 16 in the fleet, e.g., from the output signals produced by the speed sensors (again, not separately shown) comprising a part of sensors 30 that are operatively associated with each haul truck 16. In some embodiments, the speed sensors provide output data relating to the speed of the vehicle 14 on a frequent basis, e.g., at least once per second, and in substantially real-time. Therefore, control system 32 will be able to determine the actual travel empty speed of each haul truck 16 on a frequent (i.e., with high temporal resolution) and substantially real-time basis. Alternatively, in other embodiments, the speed data may be captured, cached (e.g., in memory system 38), and released to control system 32 on a periodic basis.

In any event, and regardless of how the actual travel speed data are acquired and transferred to control system 32, the control system 32 may then average the acquired actual travel empty speeds of the haul trucks 16 on a periodic basis. In the embodiments shown and described herein, the control system 32 averages the acquired actual travel empty speeds of haul trucks 16 an hour-by-hour basis for each hour in a twenty-four hour day. More specifically, the actual travel empty speeds of the haul trucks 16 traveling empty between the hours of 3-4 p.m. may be averaged to produce an average travel empty speed for the entire fleet of haul trucks 16 during that time period. For example, if ten (10) haul trucks 16 made five (5) trips each while in the empty state (i.e., traveling empty) between 3-4 p.m., then the average actual travel empty speed of the haul trucks 16 for that time period (i.e., 3-4 p.m.) would be the arithmetic average of fifty (50) actual travel empty speeds (i.e., five (5) actual travel empty speeds for each of the ten (10) haul trucks 16).

In this regard it should be noted that in some embodiments, the actual travel empty speed for a particular haul truck 16 itself may be the average actual speed for that haul truck 16 during that single trip (e.g., from a dumping area 22 to a loading area 20). For example, if the actual travel empty speed of the haul truck 16 during that trip varies between about 8 km/hr (about 5 miles/hr) and about 55 km/hr (about 34 miles/hour), the average speed during that trip, which may be about 34 km/hr (about 21 miles/hr), may be used as the actual travel empty speed of that haul truck 16 for that particular trip.

After being determined (e.g., in step 46), the average travel empty speed of haul truck 16 or haul truck fleet for each hour then may be stored in memory system 38 (e.g., in step 60). Thus, each newly stored average travel empty speed becomes an historical average travel empty speed and is added to the database of historical average travel empty speeds. The particular hour, day, month, and year for each average travel empty speed may be stored along with the average speed so that the control system 32 may identify and correlate the historical average travel empty speeds with a particular hour, day, month, and year. For example, the control system 32 will store in memory system 38 the average travel empty speed of haul truck 16 or haul truck fleet for each hour of a day, e.g., from 3-4 p.m., from 4-5 p.m., etc., for each day of a month, and for each month of a year.

During the comparing step 48, control system 32 may compare the average actual travel speed for a specific hour (e.g., from 3-4 p.m.) with the historical average travel empty speed for that same hour (e.g., from 3-4 p.m.) for previous days, weeks, and months. Generally speaking, more accurate determinations of travel restrictions may be made if the historical average travel empty speeds involve a large number of travel empty speeds captured for the particular time interval. In one embodiment, the historical average travel empty speed for each particular time interval (e.g., from 3-4 p.m.) may comprise the average travel empty speed for that particular hour for the previous year. For example, the average travel empty speed of the fleet of haul trucks 16 from 3-4 p.m. on July $1^{st}$ of the current year, may be compared with the historical average travel empty speeds for that same hour, e.g., from 3-4 p.m. for each day from July $1^{st}$ of the previous year through June $30^{th}$ of the current year.

For each defined time interval (e.g., from 3-4 p.m.) the systems, methods, and instrumentalities described herein may rank, e.g., from slowest to fastest, the average speed for that defined time interval then find the $5^{th}$ percentile of the historical average travel empty speeds for that defined time interval. As used herein, the $5^{th}$ percentile speed is defined as the speed for which 5% of travel is slower than that speed and 95% is faster than that speed. Step 48 then compares the average speed for each defined time interval with the $5^{th}$ percentile speed. Then, in step 50, if the average travel empty speed falls below (i.e., is less than) the $5^{th}$ percentile speed for that defined time interval, then the system and method determines, i.e., at step 52, that the particular time interval (e.g., from 3-4 p.m.) is subject to a travel restriction. Alternatively, percentiles other than the $5^{th}$ percentile could be used.

Control system 32 may present information and data related to the travel restrictions on user interface system 36. For example, and with reference now primarily to FIG. 4, control system 32 may generate and cause to be displayed a table 62 of various mine sites showing the number of hours during a twenty-four hour day that were subject to travel restrictions. For example, on Day 1, none of example mine sites 1-6 were subject to travel restrictions, as indicated by the "0" in each column. That is, no hours of Day 1 were subject to travel restrictions. On Day 2, mine site 3 was the only mine site subject to a travel restriction. That travel restriction persisted for a total time of 1 hour. However, on Day 7, mine sites 1, 2, 4, 5, and 6, were subject to 9, 10, 8, 4, and 10 hours of travel restrictions, respectively. Note that mine site 3 was not subject to any travel restrictions on Day 7.

If desired, control system 32 may be programmed or configured to provide a geographical depiction 64 of the restricted travel hours. For each mine site 1-6, the total number of hours for that day (i.e., Day 7) that were subject to travel restrictions is shown encircled below the approximate geographic location of the respective mine site.

It should be noted that the data displays depicted in FIG. 4 are only one example of how data associated with the travel restriction determination could be displayed, i.e., presented in user-discernable format. In most embodiments it will be desirable to program or configure control system 32 so as to allow the system operator or fleet manager to 'drill down' on the data presented in either table 62 or geographical depiction 64 to uncover other data relating to the information provided in table 62 and geographical depiction 64. For example, the systems and methods determine not only the total time of any travel restriction, but the particular time period (e.g., from 3-4 p.m.) during which the travel restriction was detected.

After determining when an individual vehicle 14 is subject to travel restrictions and, optionally, the duration of that travel restriction, the methods and systems shown and described herein may be used to make a determination about whether to conduct an evaluation (e.g., at step 66) or score (e.g., at step 72) the haul truck 16 and/or haul truck driver in accordance with the established performance parameters 68. As mentioned earlier, the established performance parameters 68 may include, but are not limited to, vehicle speed, gear selection, throttle use, retarder system use, and/or braking system use. If the systems, methods, and instrumentalities described herein determined that the haul truck 16 was operating subject to a travel restriction, then the system operator or fleet manager (not shown) may elect to defer or hold in abeyance any evaluation 66 and scoring 72 because the ability of the haul truck 16 and/or haul truck driver to operate the haul truck 16 within the established performance parameters was likely compromised by the travel restriction.

On the other hand, if the systems, methods, and instrumentalities described herein determined that the haul truck 16 was not subject to a travel restriction, then the evaluation and (optional) scoring process 66 and 68 may proceed as already described.

Unless defined otherwise, all technical and scientific terms used herein have the same meaning as commonly understood by persons having ordinary skill in the art to which the invention pertains. Although any methods and materials similar or equivalent to those described herein can be used in practice for testing of the present invention, the preferred materials and methods are described herein.

In understanding the scope of the present invention, the articles "a" and "an" are used herein to refer to one or to more than one (i.e., to at least one) of the grammatical object of the article. By way of example, "an element" means one element or more than one element. The term "comprising" and its derivatives, as used herein, are intended to be open-ended terms that specify the presence of the stated features, elements, components, groups, and/or steps, but do not exclude the presence of other unstated features, elements, components, groups, and/or steps. The foregoing also applies to words having similar meanings such as the terms, "including," "having" and their derivatives. Any terms of degree such as "substantially," "about" and "approximate" as used herein mean a reasonable amount of deviation of the modified term such that the end result is not significantly changed. When referring to a measurable value, such as an amount, a temporal duration, and the like, these terms are meant to encompass variations of at least ±20% or ±10%, more preferably ±5%, even more preferably ±1%, and still more preferably ±0.1% from the specified value, as such variations are appropriate and as would be understood by persons having ordinary skill in the art to which the invention pertains.

Throughout this disclosure, various aspects of the invention may be presented in a range format. It should be understood that the description in a range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.6, 3, 4, 5, 5.7, and 6. This applies regardless of the breadth of the range.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adapted to another embodiment. It should be noted that while the present invention is shown and described herein as it could be used in conjunction with a configuration of various components, it could be utilized with other configurations, either now known in the art or that may be developed in the future, so long as the objects and features of the invention are achieved, as would become apparent to persons having ordinary skill in the art after having become familiar with the teachings provided herein. Consequently, the present invention should not be regarded as limited to that shown and described herein. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

Having herein set forth preferred embodiments of the present invention, it is anticipated that suitable modifications can be made thereto which will nonetheless remain within the scope of the invention.

The invention claimed is:

1. A method of operating a vehicle subject to a travel restriction, comprising:
   determining when the vehicle is traveling in an unloaded state;
   determining a speed of the vehicle when the vehicle is traveling in the unloaded state to produce an actual travel empty speed;
   comparing the actual travel empty speed with an historical travel empty speed for the vehicle;
   determining that the vehicle operation is subject to the travel restriction when the actual travel empty speed is less than a predetermined percentile of the historical travel empty speed;
   when the vehicle operation is not subject to the travel restriction:
      evaluating the vehicle operation based on at least one established performance parameter for the vehicle under a normal operating condition; and
      changing at least one vehicle performance parameter during future vehicle operation based on said evaluating; and
   when the vehicle operation is subject to the travel restriction:
      continuing to operate the vehicle without performing at least one of said evaluating and changing steps.

2. The method of claim 1, further comprising assigning to the vehicle an operational score based on said evaluating and wherein said changing at least one vehicle performance parameter is based on the operational score.

3. The method of claim 1, wherein said determining when the vehicle is traveling in the unloaded state comprises sensing a signal produced by a vehicle state sensing system operatively associated with the vehicle.

4. The method of claim 3, wherein the vehicle state sensing system comprises a payload sensor and wherein said sensing a signal produced by the vehicle state sensing system comprises sensing a signal produced by the payload sensor.

5. The method of claim 3, wherein the vehicle state sensing system comprises a position sensor and wherein said determining when the vehicle is traveling in the unloaded state comprises sensing a signal produced by the position sensor.

6. The method of claim 5, wherein said determining when the vehicle is traveling in the unloaded state comprises determining when the vehicle is traveling from an unloading area to a loading area.

7. The method of claim 1, wherein said determining the speed of the vehicle comprises sensing a signal produced by a vehicle speed sensor.

8. The method of claim 1, further comprising storing in a memory system the actual travel empty speed and wherein the stored actual travel empty speed comprises the historical travel empty speed for a subsequent determination that the vehicle operation is subject to a travel restriction.

9. The method of claim 1, further comprising:
determining a plurality of actual travel empty speeds over a defined time period;
averaging the plurality of actual travel empty speeds over the defined time period to produce an average travel empty speed for the defined time period; and
wherein said comparing comprises comparing the average travel empty speed for the defined time period with an historical average travel empty speed for the defined time period.

10. The method of claim 9, further comprising storing in a memory system the average travel empty speed for the defined time period and wherein the stored average travel empty speed for the defined time period comprises the historical average travel empty speed for a subsequent determination that the vehicle operation is subject to a travel restriction.

11. The method of claim 10, wherein the defined time period is one hour.

12. The method of claim 11, further comprising:
associating the defined time period of one hour with a specific hour in a twenty-four hour day; and
wherein said comparing comprises comparing the average travel empty speed for the specific hour in the twenty-four hour day with an historical average travel empty speed for the same specific hour in a previous twenty-four hour day.

13. The method of claim 12, further comprising ranking, from a slowest speed to a fastest speed, the historical average travel empty speeds for each specific hour in the twenty-four hour day for a plurality of twenty-four hour days.

14. The method of claim 13, further comprising identifying a $5^{th}$ percentile of the ranked historical average travel empty speeds and wherein said comparing comprises comparing the average travel empty speed with the $5^{th}$ percentile of the ranked historical average travel empty speeds for the same specific hour of the twenty-four hour day.

15. The method of claim 1, wherein the predetermined percentile of the historical travel empty speed for the vehicle is a $5^{th}$ percentile.

16. A method of operating a vehicle carrying material from a loading area to a discharge area and returning to the loading area, comprising:
defining a normal operating condition for the vehicle;
establishing at least one performance parameter for the vehicle under the normal operating condition;
measuring the at least one performance parameter during vehicle operation;
determining when the vehicle operation is subject to a travel restriction;
when the vehicle operation is not subject to the travel restriction:
comparing the at least one measured performance parameter during vehicle operation with the at least one established performance parameter for the vehicle under the normal operating condition; and
changing future vehicle operation based on said comparing; and
when the vehicle operation is subject to the travel restriction:
continuing to operate the vehicle without performing said comparing.

17. The method of claim 16, further comprising determining a vehicle operational score based on said comparing and wherein said changing future vehicle operation is based on the determined vehicle operational score.

18. The method of claim 16, wherein said establishing at least one performance parameter for the vehicle comprises establishing a performance parameter comprising one or more selected from the group consisting of gear selection, throttle use, retarder use, and brake use.

19. The method of claim 16, wherein determining when the vehicle operation is subject to a travel restriction further comprises:
determining when the vehicle is traveling in an unloaded state;
determining an actual travel empty speed of the vehicle by measuring the speed of the vehicle when the vehicle is traveling in the unloaded state;
comparing the actual travel empty speed with an historical travel empty speed for the vehicle; and
determining that the vehicle operation is subject to the travel restriction when the actual travel empty speed of the vehicle is less than a defined percentile of the historical travel empty speed for the vehicle.

20. The method of claim 19, wherein the defined percentile of the historical travel empty speed for the vehicle is the $5^{th}$ percentile.

21. A system for determining when a vehicle is subject to a travel restriction, comprising:
a speed sensor operatively associated with the vehicle and producing an output signal related to a speed of the vehicle;
a state sensor operatively associated with the vehicle, the state sensor producing an output signal related to a state of the vehicle;
a control system operatively associated with said speed sensor and said state sensor, said control system being responsive to the output signals produced by said speed sensor and said state sensor, said control system:
determining, based on the output signal from said state sensor, when the vehicle is traveling in the unloaded state;
determining, based on the output signal from said speed sensor, the speed of the vehicle when the vehicle is traveling in the unloaded state to produce an actual travel empty speed of the vehicle;

comparing the actual travel empty speed with an historical travel empty speed for the vehicle; and determining that the vehicle operation is subject to the travel restriction when the actual travel empty speed is less than a predetermined percentile of the historical travel empty speed; and a user interface operatively associated with said control system, said user interface providing a user-discernable indication of whether the vehicle operation is subject to the travel restriction.

22. The system of claim 21, further comprising a network, said network being operatively connected to said speed sensor, said state sensor, and said control system, said network transferring output signals from said speed sensor and said state sensor to said control system.

23. The system of claim 22, wherein said network comprises a wireless network.

24. The system of claim 21, wherein said control system comprises a computer processor.

25. The system of claim 21, wherein said state sensor comprises a payload sensor operatively associated with the vehicle, said payload sensor producing an output signal related to a payload state of the vehicle.

26. The system of claim 21, wherein said state sensor comprises a position sensor operatively associated with the vehicle, said position sensor producing an output signal related to a position of the vehicle.

27. A non-transitory computer-readable storage medium having computer-executable instructions embodied thereon that, when executed by at least one computer processor cause the computer processor to:

determine when the vehicle is traveling in an unloaded state;

determine a speed of the vehicle when the vehicle is traveling in the unloaded state to produce an actual travel empty speed;

compare the actual travel empty speed with an historical travel empty speed for the vehicle;

determine that the vehicle operation is subject to the travel restriction when the actual travel empty speed of the vehicle is less than a predetermined percentile of the historical travel empty speed for the vehicle; and generate an output signal that is indicative of whether the vehicle operation is subject to the travel restriction.

* * * * *